(12) United States Patent
Welsch (10) Patent No.: US 9,267,746 B2
(45) Date of Patent: Feb. 23, 2016

(54) LIQUID-AIR COOLING SYSTEM

(75) Inventor: Andreas Welsch, Saarlouis (DE)

(73) Assignee: HYDAC COOLING GMBH, Sulzbach/Saar (DE)

( * ) Notice: Subject to any disclaimer, the term of this patent is extended or adjusted under 35 U.S.C. 154(b) by 0 days.

(21) Appl. No.: 13/261,679

(22) PCT Filed: Dec. 17, 2011

(86) PCT No.: PCT/EP2011/006396
§ 371 (c)(1),
(2), (4) Date: Jul. 24, 2013

(87) PCT Pub. No.: WO2012/089316
PCT Pub. Date: Jul. 5, 2012

(65) Prior Publication Data
US 2013/0306300 A1    Nov. 21, 2013

(30) Foreign Application Priority Data

Dec. 30, 2010   (DE) .......................... 10 2010 056 567

(51) Int. Cl.
| | | |
|---|---|---|
| G05D 23/00 | (2006.01) | |
| F28F 27/00 | (2006.01) | |
| F01P 7/04 | (2006.01) | |
| F04D 27/00 | (2006.01) | |
| F04D 29/58 | (2006.01) | |

(52) U.S. Cl.
CPC ............... *F28F 27/00* (2013.01); *F01P 7/048* (2013.01); *F04D 27/004* (2013.01); *F04D 29/5826* (2013.01); *F01P 2025/36* (2013.01)

(58) Field of Classification Search
CPC ....... F28F 27/00; F01P 7/048; F01P 2025/36; F04D 27/004; F04D 29/5826
USPC .................................................. 165/293, 300
See application file for complete search history.

(56) References Cited

U.S. PATENT DOCUMENTS

| | | | | |
|---|---|---|---|---|
| 5,040,379 A | * | 8/1991 | Fukunaga et al. ............... | 62/201 |
| 6,337,949 B1 | * | 1/2002 | Muron ................. | B60H 1/3205 123/41.12 |
| 6,352,106 B1 | * | 3/2002 | Hartman ............. | F16K 37/0091 165/293 |
| 7,207,297 B2 | * | 4/2007 | Hayami .................. | F01P 7/164 123/41.1 |
| 7,270,090 B2 | * | 9/2007 | Surnilla .................. | F01P 7/048 123/41.02 |
| 7,424,868 B2 | * | 9/2008 | Reckels .................. | F01P 7/167 123/41.1 |
| 7,657,347 B2 | * | 2/2010 | Campbell ............. | G01F 1/6965 137/340 |
| 9,181,850 B2 | * | 11/2015 | Roby ....................... | F01P 7/046 |
| 2001/0017110 A1 | * | 8/2001 | Ap .......................... | F01P 7/048 123/41.1 |

(Continued)

FOREIGN PATENT DOCUMENTS

| | | |
|---|---|---|
| DE | 100 62 534 A1 | 7/2001 |
| DE | 100 16 435 A1 | 10/2001 |

(Continued)

*Primary Examiner* — Ljiljana Ciric
(74) *Attorney, Agent, or Firm* — Wenderoth, Lind & Ponack, L.L.P.

(57) ABSTRACT

A liquid-air cooling system (1) has at least one fan device (2) including at least one variable-speed fan motor (3) driving a fan impeller (4) to create a cooling power for a fluid (5) in a fluid cycle (6). To regulate the speed of the fan motor (3) by a control and/or regulation device (24), at least one actual value (Ta) downstream of a segmented heat exchanger (19) is compared to a predefined desired value (Tb). The control and/or regulation device (24) adjusts the cooling power according to the current power values of the respective machine unit (9).

10 Claims, 6 Drawing Sheets

(56) References Cited

U.S. PATENT DOCUMENTS

| | | | |
|---|---|---|---|
| 2002/0050251 A1* | 5/2002 | Takahashi | F01P 7/048 123/41.1 |
| 2002/0152972 A1* | 10/2002 | Iwasaki | F01P 7/164 123/41.44 |
| 2003/0217707 A1* | 11/2003 | Iwasaki | B60H 1/02 123/41.31 |
| 2004/0069546 A1* | 4/2004 | Lou | B60K 6/22 180/65.21 |
| 2005/0207899 A1 | 9/2005 | Furuta | |
| 2006/0062678 A1* | 3/2006 | Furuta | E02F 9/226 417/423.1 |
| 2006/0096554 A1* | 5/2006 | Shiozaki | 123/41.12 |
| 2007/0163759 A1* | 7/2007 | Klein et al. | 165/121 |
| 2008/0188173 A1* | 8/2008 | Chen | F04D 27/004 454/239 |
| 2009/0211542 A1* | 8/2009 | Guerrero | B60H 1/00 123/41.13 |
| 2009/0255278 A1* | 10/2009 | Taras | F25B 49/025 62/115 |
| 2010/0065355 A1* | 3/2010 | Reddy | B60K 1/02 180/65.31 |
| 2013/0112392 A1* | 5/2013 | Karpinski | F28F 25/12 165/300 |
| 2015/0308441 A1* | 10/2015 | Magaziner | F04D 27/00 417/326 |

FOREIGN PATENT DOCUMENTS

| | | |
|---|---|---|
| DE | 101 58 917 B4 | 6/2003 |
| DE | 103 31 216 B3 | 9/2004 |
| EP | 0 968 371 B1 | 1/2000 |
| JP | 2003 054 250 A | 2/2003 |

* cited by examiner

LIQUID-AIR COOLING SYSTEM

FIELD OF THE INVENTION

The invention relates to a liquid-air cooling system that includes at least one fan device comprising at least one variable-speed fan motor that powers a fan impeller to generate cooling capacity for a fluid of a cooling cycle. To control the speed of the fan motor by an automatic control system, at least one actual default value that originates from a machine unit connected to the liquid-air cooling system, is compared to a desired default value. The cooling capacity of the liquid-air cooling system is then adjusted as a function of the current output temperature values of the respective machine unit.

BACKGROUND OF THE INVENTION

EP 0 968 371 81 discloses and describes a fluid cooling device comprising a motor that powers a fan impeller and a fluid pump. The fluid pump takes fluid from an oil reservoir and conveys it into a hydraulic operating cycle. In the hydraulic operating cycle, the fluid (hydraulic medium) is heated and routed to a heat exchanger. From the heat exchanger, the cooled fluid is recirculated to the oil reservoir. The oil reservoir of the fluid cooling system is configured in the shape of a basin with particularly high-reaching basin edges that are suitable to form a housing part for receiving the fan impeller and an air-routing chute for a heat exchanger of the fluid cooling device. With the fluid cooling device, an oil reservoir can be provided in an especially compact assembly for storing and circulating large fluid volumes.

A control system and a method for controlling the speed of a plurality of fans for cooling a plurality of flow media of a machine unit are disclosed in DE 100 62 534 A1. The speed of each of the plurality of fans is controlled specifically according to an individual heat dissipation requirement of heat transfer cores. For one temperature sensor, respectively, of each of the plurality of flow media, current temperatures are monitored. Each sensor can be operated to generate a signal that displays the temperature of the respective flow medium, while transferring the signal to an electronic control device to control the respectively singular speed of each of the fans.

Using the previously described solution, temperature-control, especially cooling, tasks for a fluid of a hydraulic circuit can be basically implemented. However, particularly the temperature of the fluid that has passed through the fan device is, seen in absolute terms, dependent on the respective and varying ambient temperature of the hydraulic power pack. The output temperature of the fluid therefore fluctuates in the known hydraulic power packs and fluid cooling devices after it passes through the fan device.

SUMMARY OF THE INVENTION

An object of the present invention to provide an improved liquid-air cooling system having a fan device with a cooling capacity that takes into account the ambient temperature of the liquid-air cooling system and that is able to permanently implement an exact desired temperature of the fluid.

This object is basically achieved by a liquid-air cooling system that includes a fan device with a fan impeller powered by a variable-speed fan motor. The system basically allows for the implementation of cooling capacity for a fluid in a cooling cycle taking into account an actual default value—such as a temperature value—that originates from a machine unit that can be connected via the fluid cycle to a liquid-air cooling system. According to the invention, the liquid-air cooling system also includes the possibility of taking into account a desired default value, The desired default value is then compared to the actual default value such that the cooling capacity of the fan device is adjusted as a function of the actual output values of the machine unit that is supplied with fluid.

An automatic control system handles a corresponding desired/actual comparison and speed control of the fan motor. The actual default value and the desired default values therein can be represented by a temperature value. The actual default value and the desired default value can also be described by suitable other characteristic values that relate to a current operating point of the machine unit and a current actual temperature value that reflects the current operating conditions with regard to the liquid-air cooling system.

In an especially preferred embodiment of the liquid-air cooling system, and particularly using a memory and as a processor of the automatic control system that adjust the speed of the fan impeller, an air temperature is provided, for example as a desired default value, on the air supply side of the fan device. A desired default value is either a temperature of the ambient air of the hydraulic power pack or a temperature of the machine unit or of a component of the machine unit that receives a fluid flow-through for the purpose of temperature control.

Ambient air is provided as a cooling medium to increase the energy efficiency of the liquid-air cooling system. Advantageously, the speed of the fan motor is controlled in such a manner that the fluid temperature of the coolant is maintained at a value that is lowered, for example, by 5° Kelvin or more in comparison to a desired temperature that represents the desired default temperature. To be able to implement a cost-effective liquid-air cooling system, advantageously, a variable-speed motor is selected as the fan motor. For a fan motor control, a corresponding automatic control system is advantageously used in connection with a machine unit or, when bus systems are used, for the transmission of the desired default value as well as the actual default value, or, in the sense of a field bus system, for networking a plurality of machine units. A PID controller therein controls the speed of the fan motor. PID control systems are known to the person skilled in the art and are commonly used for controlling the operation of mechanical drives or other mechanical equipment accessories of machine units. The invention comprises using any type of PID control. The output quantity of the PID control is limited to the maximum allowable speed of the fan motor and/or the fan impeller.

In an especially preferred embodiment, the liquid-air cooling system is combined onto a compact unit with a minimized required assembly space comprising a fluid tank, a motor for powering a fluid pump, the fluid pump itself and the fan motor plus the fan impeller and any associated cooling apparatus as well as a cooler housing. Especially preferably, the motor for powering the fluid pump is mounted directly on the fluid tank.

For expediency, the geometric dimensions of the aforementioned components of the liquid-air cooling system are selected in such a manner that the fan device and the motor for powering the fluid pump essentially do not extend beyond a base area of the fluid tank.

The fluid can be, for example, transmission oil or hydraulic oil, or also a mixture of water and glycol.

With the liquid-air cooling system, very exact temperature-control tasks can be carried out on a machine tool, transmission, extruder, motor, frequency converter or on other types of machine units. Using a minimum of energy, a permanent, relative to temperature fluctuations or a temperature-controlled machine unit, exact operation of a corresponding machine unit can be achieved. Using the liquid-air cooling system, a bed of a machine unit or a singular machine component, such as a spindle of the machine unit, can be supplied with fluid, particularly a temperature-control fluid.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure and that are not drawn to scale.

DETAILED DESCRIPTION OF THE INVENTION

Figure 1:
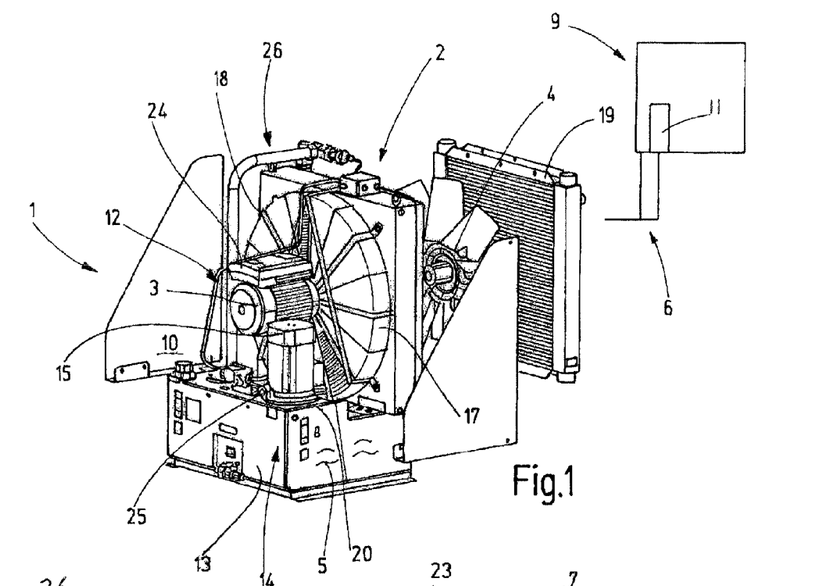
FIG. 1 is a perspective view of a liquid-air cooling system according to an exemplary embodiment of the invention.
Figure 2:
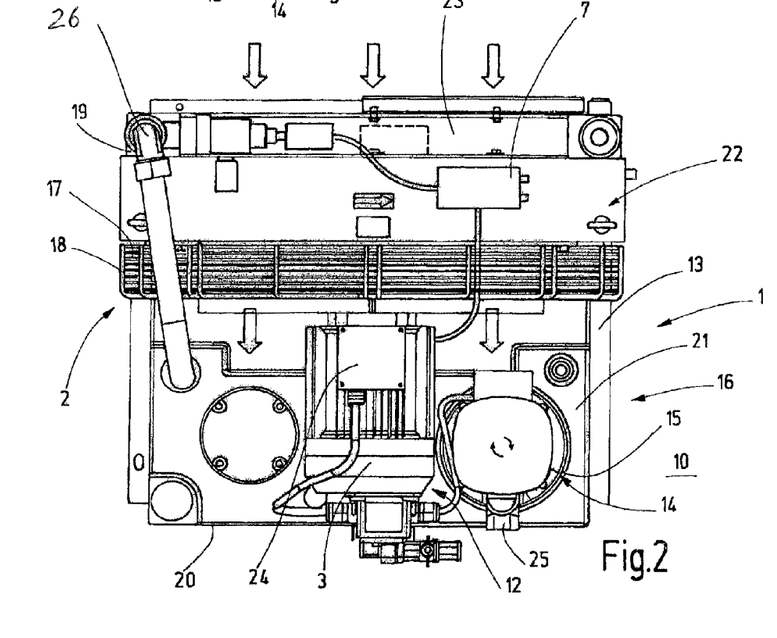
FIG. 2 is a top plan view of the liquid-air cooling system of FIG. 1.
Figure 3:
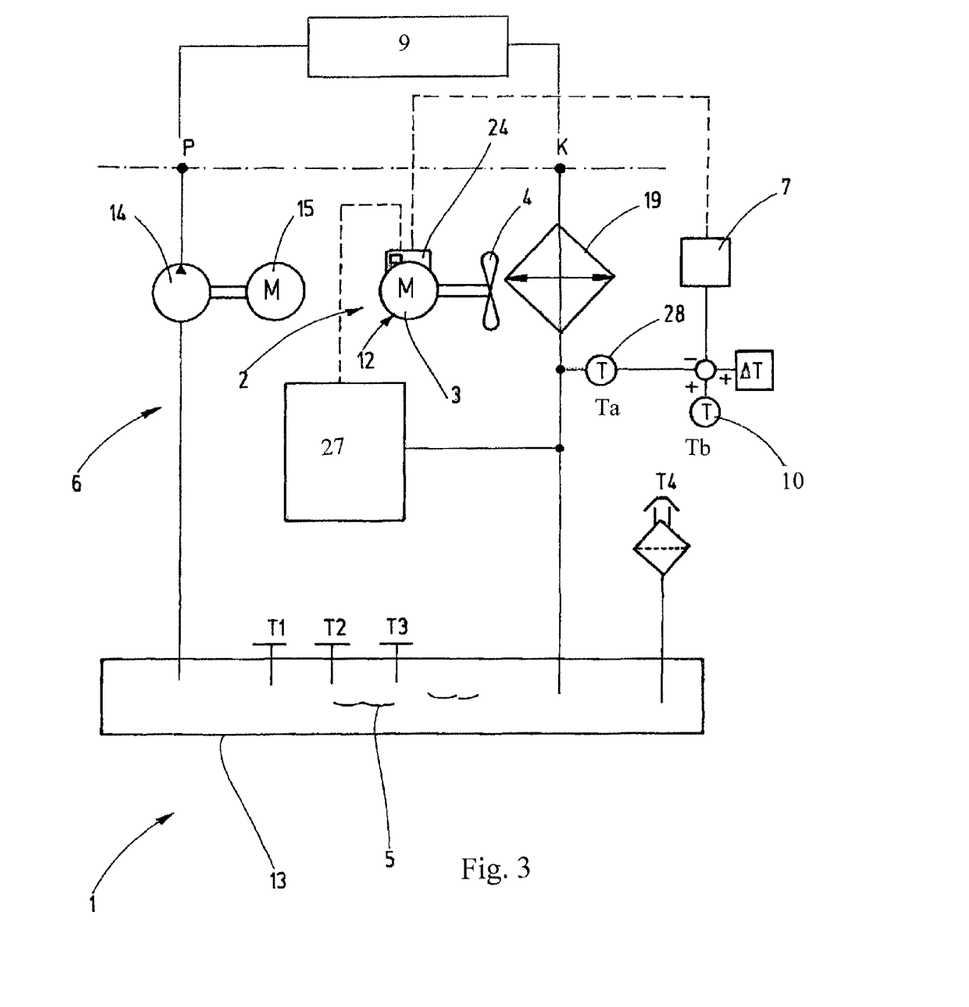
FIG. 3 is a schematic circuit diagram of the liquid-air cooling system of FIG. 1.

FIG. 1 shows a perspective view and partially exploded diagram of a liquid-air cooling system 1 that supplies a machine unit 9 and/or a component 11 of a machine unit 9, shown schematically, with a fluid 5, which fluid is envisioned as a temperature-control fluid. Associated with the liquid-air cooling system 1 is a fan device 2 that includes a variable-speed fan motor 3, embodied as an electric motor 12, that powers a fan impeller 4 with individual fan vanes in the manner of an axial fan. The fan impeller 4 is partially received by a fan impeller housing 22 and protective grate 17. The fan impeller housing 22 can be made of plastic or sheet metal parts. As also seen in FIG. 2 in a top view of the liquid-air cooling system of FIG. 1, a protective grate 18 is provided in the rear section of the fan impeller 4 for safety reasons. On the opposite side of the fan impeller 4, a heat exchanger 19 in the form of a cellular radiator is disposed in relation to the protective grate 18. The heat exchanger 19 extends across the totality of the projection area swept by the fan impeller 4.

As shown in FIG. 1, the fan impeller 4 sucks ambient air from right to left through the ribs of the cellular radiator and toward the fan motor 3. In principle, the presently shown fan device 2 can also be designed and operated with the cooling air in the opposite direction of flow. The fan impeller housing 22 is designed as a box mounted vertically on a fluid tank 13. The fluid tank 13 is essentially formed as a block-shaped component. The cross-section of the fluid tank 13 has an L-shape, as shown in FIG. 1, such that an assembly base 20 for a motor 15 is elevated above the remainder of the cross-section of the fluid tank 13 and is formed for a motor 15 of a fluid pump 14 located inside the fluid tank 13. The distributor rail 7 is disposed on the fan impeller housing 22. A sensor 28 for detecting the actual temperature Ta is disposed in the fluid connection of the heat exchanger 19 between the cellular radiator 19 and the fluid tank 13. The control system 24 is disposed on the motor 3. The sensor for detecting the desired temperature 10 is disposed in the direction of flow upstream of the cellular radiator 19 and protected against direct air flow. The total fan device 2 and the motor 15 for powering the fluid pump 14 extend only negligibly beyond a base area 16 of the fluid tank 13. The desired temperature can additionally or alternately also be measured directly on the machine unit that is in operation by a corresponding sensor.

A motor control unit 24 is mounted directly on the top side of the fan motor 3, or the outside area thereof provided with cooling ribs, respectively. Resulting is an integrated cable connection between the motor control unit 24 and the fan motor 3. This structural measure avoids electromagnetic interference fields during the operation of the fan motor 3 and increases the EMV tolerance of the hydraulic power pack 1. The motor control unit 24 includes, in particular, a frequency converter that is parameterized individually in the presently shown embodiment by a separate operating unit and can be connected by a cable plug-in connection that is adjustable for the respective application of the fan motor 3.

The fluid pump 14 conveys a temperature-control fluid in the presently shown embodiment, preferably a water-glycol mixture, and is embodied as an immersion pump. The fluid pump 14 therein can basically be designed, in terms of the construction type, more for a large volume flow or more for a correspondingly high pressure level of fluid 5 in a liquid-air cooling system circuit 6 for the machine unit 9. The construction type of the fluid pump 14 can be, for example, a rotary pump or a pump with displacement elements like, for example, a roller pump or a rotary vane-type pump or a gear-type pump. Pump parts of the fluid pump 14 extend from and into the fluid tank 13 for the removal of fluid, not shown in further detail. In particular, the fluid pump 14 has a pump opening 25 for removing the fluid 5 from the fluid tank 13. After the fluid 5 has run through the machine unit 9 or also a component 11 of the machine unit 9, it is routed into the cellular radiator 19 via connection K. Cooled fluid 5 leaves the heat exchanger 19 directly via the actual value sensor and pipes 26 in the fluid tank 13.

The temperature difference that is adjusted in the present embodiment is >5° Kelvin. A PID controller 27 in the motor control unit 24 serves particularly as a speed controller for the fan motor 3. The distributor rail 7, the motor control unit 24 as well as the PID controller 27 can also be combined into an automatic control system (not shown).

Figure 4A:
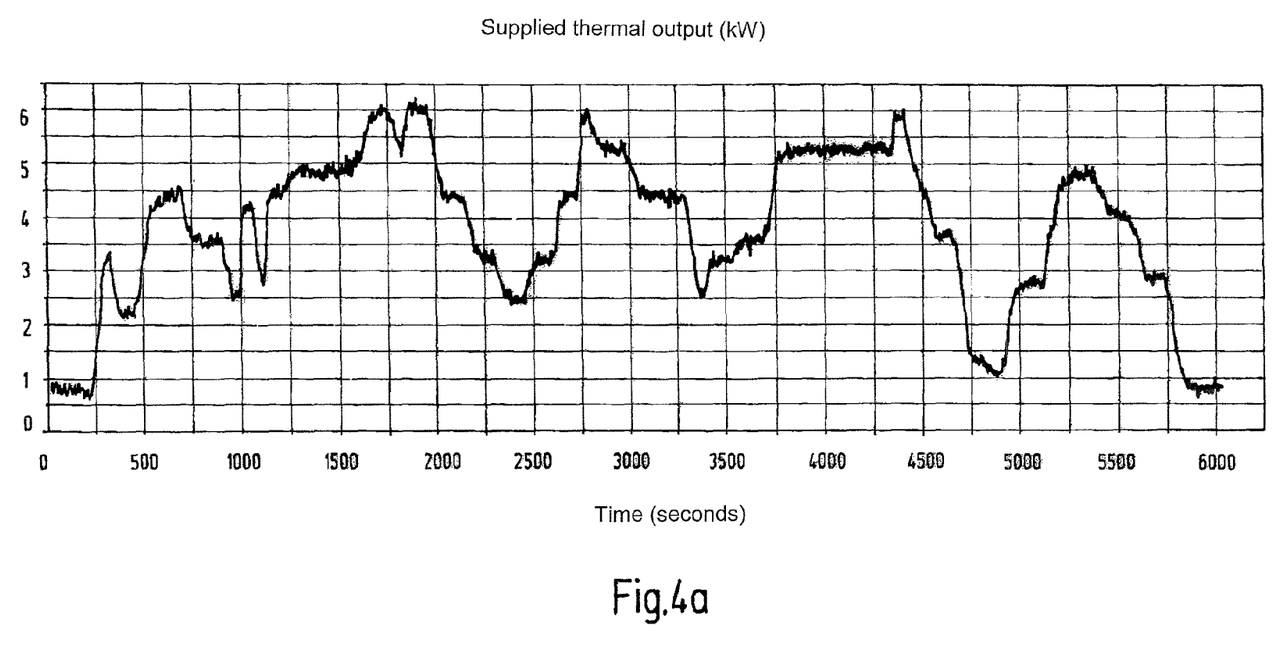
FIG. 4a is a graph of an example of the heat output from a machine unit that is supplied to the liquid-air cooling system.

FIGS. 4a to 4d show logs of relevant operational parameters during the operation of the liquid-air cooling system 1 and of the machine unit 9 that is cooled by the same. For example, FIG. 4a shows the heat output that is supplied by the machine unit 9 to the liquid-air cooling system 1 via the fluid 5 heated inside the machine unit 9 over a time interval from 0 to 6000 seconds. The supplied heat output fluctuates during this time interval between approximately 0.8 to 6.3 kW. During normal operation (time interval between 1000 seconds and 4,500 seconds), the supplied heat output fluctuates in the presently shown embodiment between 2.5 and 6.3 kW.

Figure 4B:
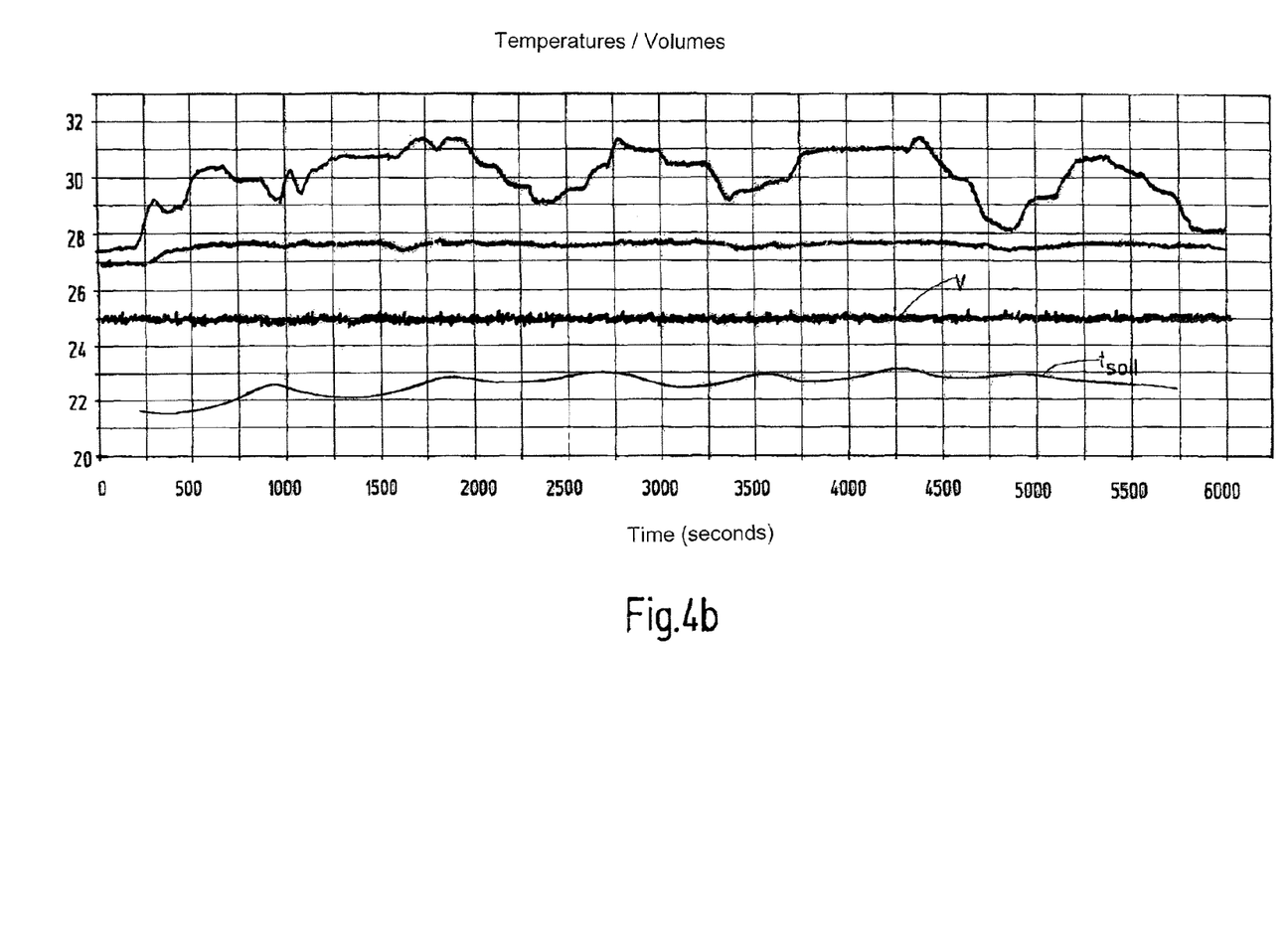
FIG. 4b is a superimposed curve diagram showing the developments over time of the temperature of the fluid before entering in the machine unit, the temperature of the fluid downstream of the pump outlet, the fluid volume flow V, and the air ambient temperature of the hydraulic power pack.

FIG. 4b shows relevant temperature developments on the liquid-air cooling system plotted over the same time interval. The top curve in FIG. 4b shows an embodiment of the temperature development of the temperature of fluid 5 at the inlet of the liquid-air cooling system 1, meaning after it has left the machine unit 9 and prior to flowing into the heat exchanger 19. The desired default value as depicted in the embodiment by the mentioned temperature fluctuates between approximately 28 and 32° C.

Below the top curve in FIG. 4b is a curve of the fluid temperature of the fluid 5 after leaving the liquid-air cooling system 1 and after the cooling operation. This curve shows that the output temperature of the fluid 5 almost does not fluctuate at all after an adjustment process during a time interval of approximately 250 to 600 seconds, after which the temperature adjusts itself to approximately 27.8° C.

Below these mentioned temperature courses, FIG. 4b depicts a volume flow V of the fluid 5 in the liquid-air cooling system 1 during the same time interval. The volume flow V is almost exactly 25 l/min. Below this curve, FIG. 4b shows a typical course of a desired default value; presently a temperature Tb of the ambient air of the liquid-air cooling system 1 is shown. During the depicted time interval, the ambient air temperature fluctuates between 21 and 23° C. Correspondingly, with the liquid-air cooling system 1, very exact temperature management of the components 11 of a machine unit 9, for example in form of a machine tool spindle drive or a total machine unit 9, such as a processing center or a machine tool, has become possible. The liquid-air cooling system 1 according to the invention is therefore able to provide for a marked improvement of the machine's accuracy during processing.

Figure 4C:
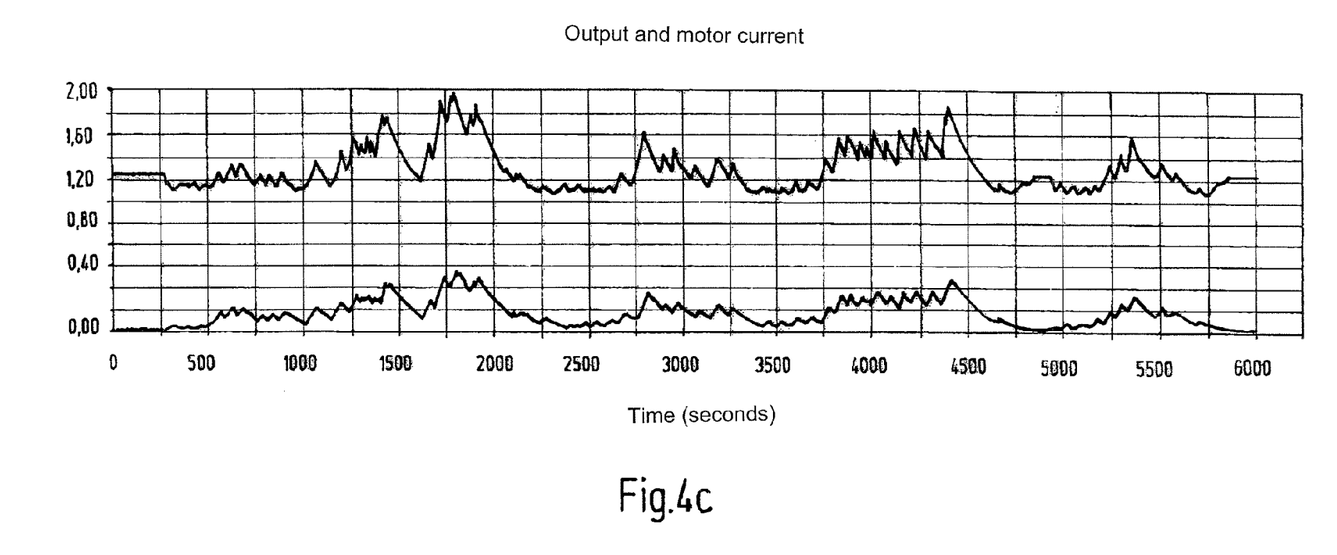
FIG. 4c is a superimposed curve diagram showing the developments over time of the motor current of the fan motor, measured in Amperes, and the provided motor power of the fan motor, measured in kilowatts.

FIG. 4c depicts, in the top curve, the course that the motor current of the fan motor 3 takes, while the bottom curve represents the course of the motor output of the liquid-air system of the fan motor 3. In the depicted embodiment, the motor current fluctuates between approximately 1.2 and 2.2 Ampere, while the recorded motor output is between approximately 0 and 400 Watt.

Figure 4D:
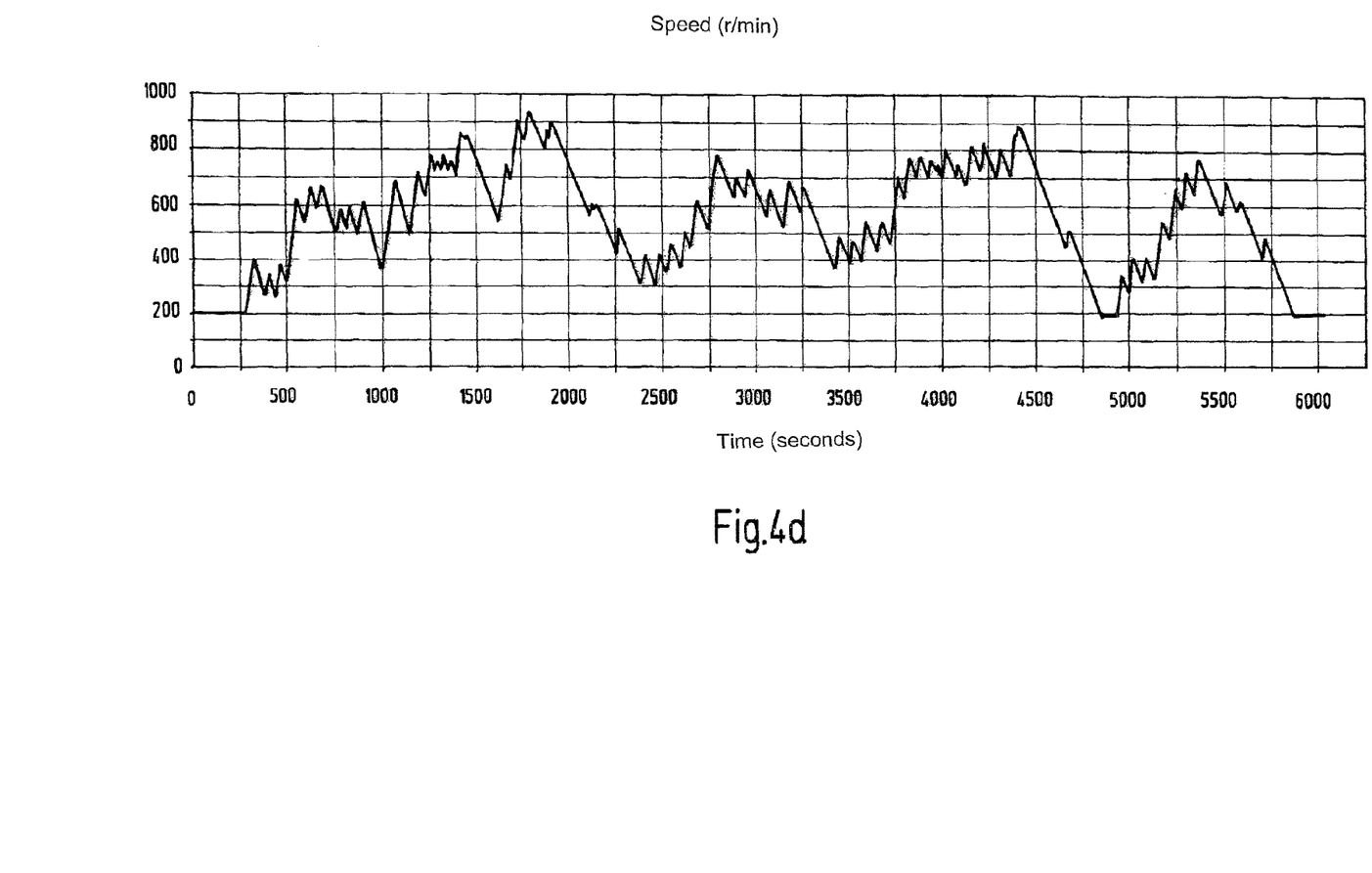
FIG. 4d is a graph showing the development over time of the speed of the fan motor.

FIG. 4d is a representation of the speed fluctuation of the fan impeller 4 that is necessary to be able to depict the exact output temperature of fluid 5, as shown in FIG. 4b, after exiting the heat exchanger 19. The speed of the fan impeller 4 therein fluctuates in a relatively wide range between approximately 200 and almost 1000 revolutions/min. The selected speed and/or speed range is also documented, such that the hydraulic power pack 1 is quite able to ensure, owing to comparatively minimal blade tip speeds of the fan blades, a minimal noise level during operation.

While one embodiment has been chosen to illustrate the invention, it will be understood by those skilled in the art that various changes and modifications can be made therein without departing from the scope of the invention as defined in the appended claims.

What is claimed is:

1. A liquid-air cooling system, comprising:
   a fan device including at least one fan impeller powered by at least one variable-speed fan motor;
   a fluid cycle with a coolant fluid therein cooled by an ambient air flow produced by said fan device increasing a cooling capacity for the coolant fluid; and
   an automatic control controlling speed of said fan motor to maintain a temperature of the coolant fluid that is lower by a set amount in comparison to a desired default temperature value, said control comparing at least one actual temperature value of the fluid to the desired default temperature value of the coolant fluid to adjust the cooling capacity by varying speed of said fan motor as a function of current output temperature values of a machine unit coupled to said fluid cycle, the desired default temperature value being one of a machine unit temperature and a temperature of a component at the machine unit.

2. The liquid-cooling system according to claim 1 wherein the speed of said fan motor is controlled such that air temperature on a supply side of said fan device is lower than the desired default temperature valve value.

3. The liquid-air cooling system according to claim 1 wherein said fan motor is connected to and triggered by a motor control having an integrated frequency converter circuit with a PID controller.

4. The liquid-air cooling system according to claim 1 wherein
   said fan device and said automatic control are parts of a compact unit having a fluid tank and a fluid pump with a pump motor.

5. The liquid-air cooling system according to claim 4 wherein
   said fan impeller is mounted in a fan housing; and
   said pump motor, said fan housing and said fan motor are mounted on said fluid tank.

6. The liquid-air cooling system according to claim 5 wherein
   said fan device and said pump motor are essentially totally within a base area of said fluid tank.

7. The liquid-air cooling system according to claim 1 wherein
   said fluid comprises a mixture of water and glycol.

8. The liquid-air cooling system according to claim 1 wherein
   said machine unit is a machine tool.

9. The liquid-air cooling system according to claim 1 wherein
   said machine unit receives the fluid.

10. The liquid-air cooling system according to claim 1 wherein
    said fan motor is an electric motor.

* * * * *